Dec. 6, 1966     H. W. STIER     3,289,272
CUTTING TOOLS WITH THROW-AWAY INSERTS
Filed Oct. 13, 1964     2 Sheets-Sheet 1
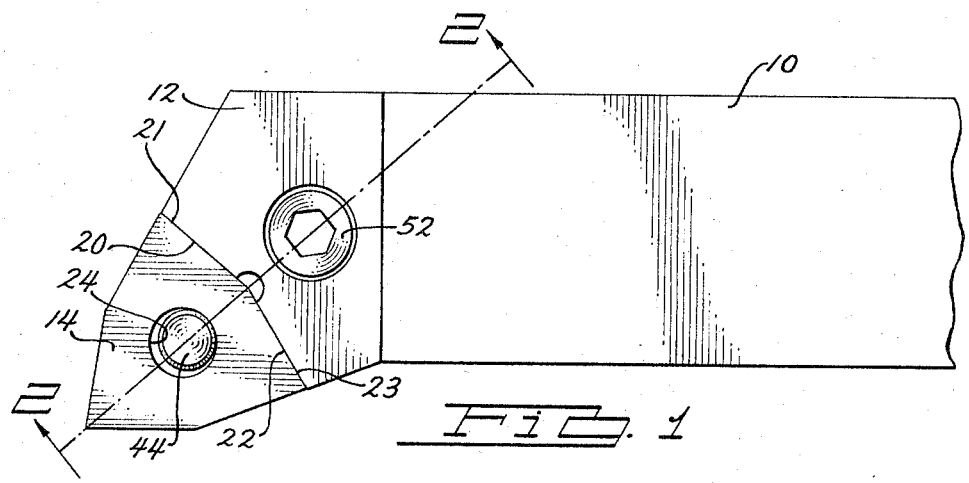
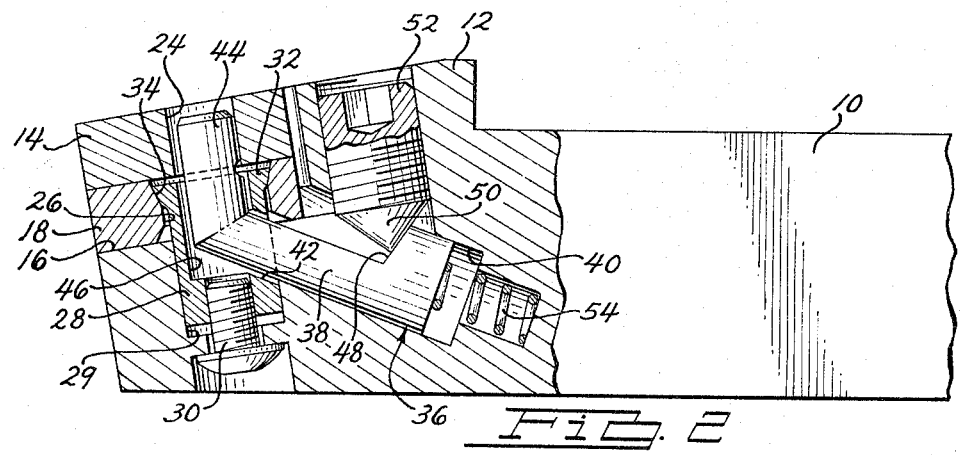
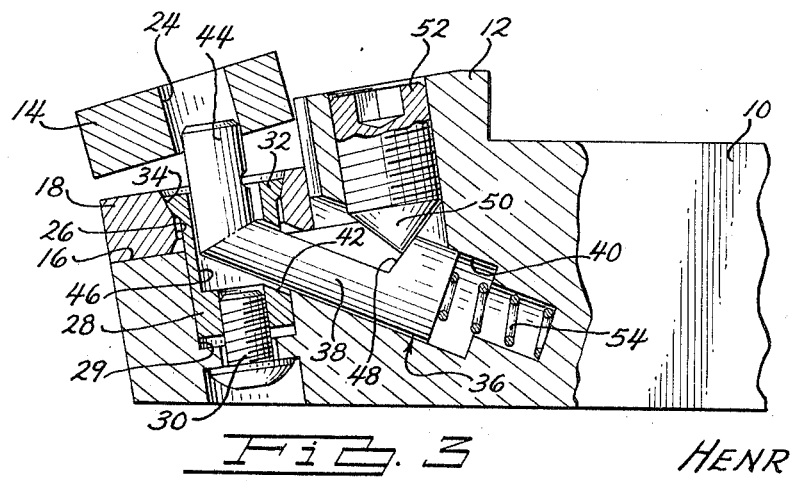
INVENTOR.
HENRY W. STIER
BY
Bower & Patalidis
ATTORNEYS

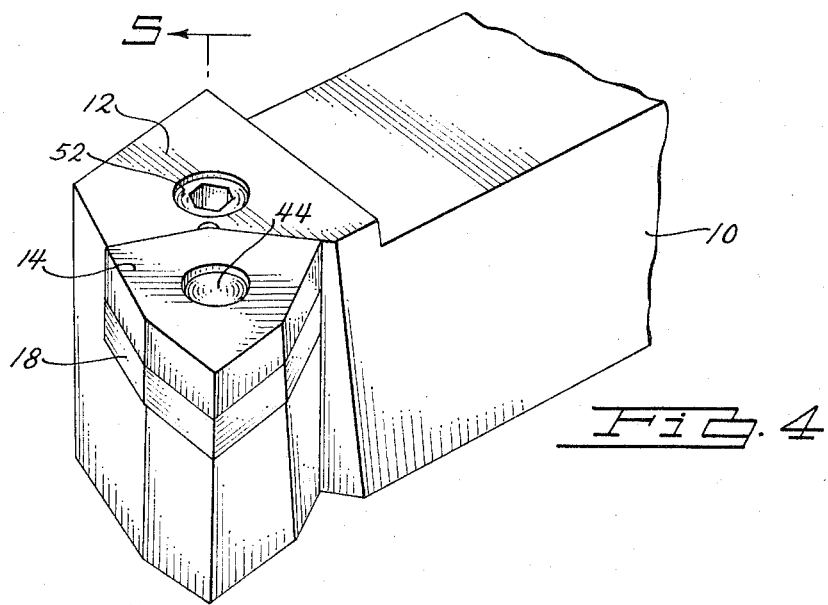
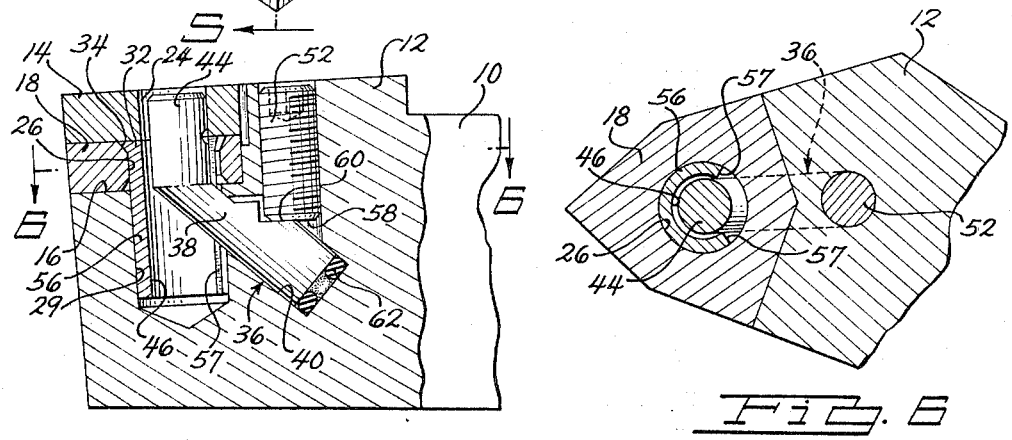
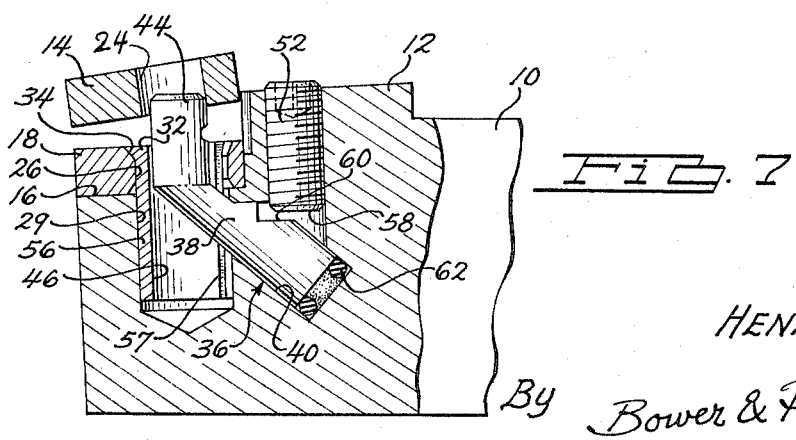
Inventor
HENRY W. STIER
By Bower & Patalidis
Attorneys

United States Patent Office 3,289,272
Patented Dec. 6, 1966

3,289,272
CUTTING TOOLS WITH THROW-AWAY INSERTS
Henry W. Stier, Dearborn Heights, Mich., assignor to Willey's Carbide Tool Company, Detroit, Mich.
Filed Oct. 13, 1964, Ser. No. 403,547
3 Claims. (Cl. 29—96)

This invention relates to improvements in cutting tools, and more particularly to improvements to cutting tools having a readily releasable and replaceable indexable cutting insert of the throw-away type, made of ultra-hard materials such as cemented carbides and the like.

When a cutting edge of the cutting insert in the cutting tool of the invention becomes worn, the cutting insert is released from the tool holder and reinserted therein with a different cutting edge in operative position and when all the cutting edges are totally worn, the cutting insert is replaced by a new one.

An object of the invention is consequently to provide a cutting tool having a removable throw-away cutting insert clamped in a recess in a tool holder, so that the insert can be quickly and easily released for indexing to a new cutting edge, or for replacing by a new insert when all the cutting edges are worn.

Another object of the invention is to provide positive holding means for a cutting insert in a tool holder so that the insert will stay in position even under heavy loading.

A further object of the invention is to provide means for holding and clamping an indexable throw-away cutting insert in a pocket or recess in a tool holder with no portion of the holding means protruding from the tool holder or overtopping the insert.

Still another object of the invention is to provide holddown and clamping means for a throw-away cutting insert disposed in a pocket or recess in a tool holder, which enables the insert to be clamped or released by manipulation of a single element of the holddown and clamping means.

Other objects and advantages of the invention will become apparent from the following specification, taken in connection with the accompanying drawings wherein like or equivalent parts are identified by the same reference numerals in the several views.

In the drawings:
FIG. 1 is a top plan view of a cutting tool embodying the principles of the present invention;
FIG. 2 is a cross-sectional view along line 2—2 of FIG. 1, with the throw-away cutting insert shown clamped in position in the tool holder pocket or recess;
FIG. 3 is a view similar to FIG. 2, but showing the throw-away cutting insert in a released position;
FIG. 4 is a perspective view of another embodiment of a cutting tool according to the present invention;
FIG. 5 is a cross-sectional view along line 5—5 of FIG. 4;
FIG. 6 is a cross sectional view along line 6—6 of FIG. 5; and
FIG. 7 is a view similar to FIG. 6, but showing the throw-away insert in a released position.

Referring now to the drawings, and more particularly to FIGS. 1–3 thereof, a cutting tool according to the present invention comprises a shank 10, generally rectangular in cross section, and so arranged dimensionally and otherwise that it may be accommodated in the tool post of a conventional metal cutting machine, such as a lathe, the shank 10 being in turn provided with a head portion 12 having a throw-away cutting insert 14 disposed in a pocket or recess therein. The pocket or recess has a bottom surface 16 supporting a shim 18 which has the same general configuration as the throw-away cutting insert. The pocket is open to at least one side of the cutting tool head in such a manner as to expose at least one cutting edge to a workpiece (not shown), and is further provided, in the example of embodiment shown in the drawings, with two back walls 20 and 22.

The insert 14 has a bore 24 substantially at the geometric center of the insert opposed faces, the axis of the bore 24 being also substantially perpendicular to the parallel planes of said faces. The shim 18 is provided with a similarly situated bore 26 substantially axially aligned with the insert bore 24 when the insert is placed in the pocket with its rear faces 21 and 23 engaging the pocket back walls 20 and 22. The shim 18 is held in position against the bottom surface 16 of the pocket by means of a tubular member 28 introduced through the shim bore 26 into a first bore 29 in the body of the tool holder and affixed therein by means of a screw 30, or the like, and having a tapered head 32 engaging a countersunk portion 34 of the shim bore 26.

A retractable holding member 36, adapted to hold down and clamp the cutting insert 14 in position in the pocket, has a body portion 38 disposed in an inclined second bore 40 in the body of the tool holder. The body portion 38 of the retractable holding member 36 passes through an aperture 42 in the wall of the tubular member 38 and is provided with an angled clamping end 42 disposed in the bore 24 of the cutting insert 14. The internal bore 46 of the hollow tubular member 28 is evidently of a diameter slightly larger than the diameter of the bore 24 in the cutting insert, to accommodate lateral displacements of the angled clamping end 42 without binding.

The body portion 38 of the retractable holding member is provided with a flat wedging surface 48 disposed close to the other end of the body portion 38 and adapted to normally engage the conical end 50 of a clamping screw 52 under the action of a coil spring 54 disposed between the end of the retractable holding member body portion 38 and the closed end of the bore 40 in the body of the tool holder.

The cutting insert 14 is normally clamped and securely held down in position in the pocket, as shown in FIG. 2, by means of the retractable holding member 36 having its clamping end 42 engaging the wall of the insert bore 24, the holding member being pulled to the right, as seen in FIG. 2, by the action of the clamping screw 52 being drawn in so that its conical end 50 firmly engages and presses against the wedging surface 48 of the retractable holding member. It is obvious that this oblique pulling of the retractable holding member 36 causes the clamping end 44, by frictional engagement with the wall of the cutting insert bore 24, to press the bottom surface of the cutting insert 14 firmly against the top surface of the shim 18 while, at the same time, urging the insert rear faces 21 and 23 to abut against the pocket back walls 20 and 22. To release the cutting insert 14, the clamping screw 52 is backed and, under the action of spring 54, the retractable holding member 36 is moved toward the left to the position shown in FIG. 3, thereby removing the downwardly and rearwardly directed load on the cutting insert 14, thus freeing the insert for removal for indexing or replacement.

The example of embodiment of the invention illustrated in FIGS. 4–7 is substantially the same as the example of embodiment of FIGS. 1–3 hereinbefore described. The only modifications consist in using a tempered split hollow pin 56, such as is generally known under the name of "roll pin," pressed into the bore 29 in the body of the tool holder and holding the shim 18 by means of its conical head 32 engaging the countersunk portion 34 of the shim bore 26, and in the clamping screw 52 being modified so as to present a flat end 58 normally engaging and pressing against a flat surface 60 in the retractable holding member 36. The split or gap 57 in the hollow pin 56 is so dimensioned as to afford passage therethrough to the body portion 38 of the retractable holding member 36, as best seen in FIG. 6. Also, instead of being urged to a release position by means of a spring as shown in the embodiments of FIGS. 1–3, the retractable holding member is, in the modification of FIGS. 4–7, biased by means of a resilient member such as an O-ring 62. The operation and function of the embodiment of the invention illustrated in FIGS. 4–7 is evidently the same as the embodiment of FIGS. 1–3.

It will be understood that various changes in the details and arrangements of elements which have herein been described and illustrated in order to explain the nature of the invention may be made by those skilled in the art without departing from the principle and scope of the invention as expressed in the appended claims.

It is also evident that some elements may be omitted, such as, for example, the shim 18, and that the cutting insert 14 may be disposed directly on the bottom surface of the pocket, without departing from the spirit and scope of the invention.

What is claimed as new is:

1. A cutting tool comprising:
 a shank having at one end thereof a pocket open at least to one side of said shank, said pocket being provided with a bottom surface and at least one back wall;
 a first bore in said shank, said first bore having its axis normal to the bottom surface of said pocket and substantially at the geometric center thereof;
 a shim disposed on said bottom surface and provided with a top surface parallel to said bottom surface and with a countersunk bore substantially aligned with said first bore in said shank;
 a tubular member disposed in said first bore, said tubular member being provided with a tapered head engaging the countersunk portion of the bore in said shim for holding said shim in position in said pocket;
 a cutting insert disposed on top of said shim, said cutting insert being provided with a substantially centrally disposed bore having an axis substantially perpendicular to said top surface of said shim and aligned with the hollow portion of said tubular member;
 a second bore in the body of said shank angularly disposed in relation to said first bore;
 a retractable holding member having a clamping end substantially aligned with and disposed within the bore in the cutting insert and an angled body portion passing through the wall of said tubular member and disposed in said second bore in the body of said shank;
 screw means engaging a flat portion of said body portion for drawing said angled body portion so as to cause said clamping end to frictionally engage the bore in said cutting insert for causing at least one side of said insert to press against the back wall of said pocket and the bottom of said insert to press against the top surface of said shim; and
 biasing means urging the body portion of said holding member in an opposite direction when said screw means is backed away so as to release said cutting insert.

2. A cutting tool comprising:
 a shank having at one end thereof a pocket open at least to one side of said shank, said pocket being provided with a bottom surface and at least one back wall disposed at right angles to said bottom surface;
 a shim disposed on said bottom surface and provided with a top surface parallel to said bottom surface;
 means holding said shim in position in said pocket;
 a cutting insert disposed on top of said shim, said cutting insert being provided with a substantially centrally disposed right cylindrical bore having an axis substantially perpendicular to said top surface of said shim;
 a retractable holding member having a right cylindrical clamping end substantially aligned with and disposed within said bore and an angled body portion disposed in an angled bore in the body of said shank;
 screw means having a principal axis parallel with said insert bore axis engaging a flat portion of said angled body portion for drawing said angled body portion so as to cause said clamping end to frictionally engage the bore in said cutting insert for causing at least one side of said insert to press against the back wall of said pocket and the bottom face of said insert to press against the top surface of said shim, said one side of said insert disposed at right angles to said bottom face of said insert; and
 biasing means urging the body portion of said holding member in an opposite direction when said screw means is backed away so as to release said cutting insert.

3. A cutting tool comprising:
 a shank having at one end thereof a pocket open at least to one side of said shank, said pocket being provided with a bottom surface and at least one back wall disposed at right angles to said bottom surface;
 a cutting insert disposed in said pocket and provided with a substantially centrally disposed right cylindrical bore having an axis substantially perpendicular to said bottom surface of said pocket;
 a retractable holding member having a right cylindrical clamping end substantially aligned with and disposed within said bore and an angled body portion disposed in an angled bore in the body of said shank;
 screw means having a principal axis substantially parallel with said insert bore axis engaging a flat portion of said angled body portion for drawing said angled body portion so as to cause said clamping end to frictionally engage the bore in said cutting insert for causing at least one side of said insert to press against the back wall of said pocket and the bottom face of said insert to press against the bottom surface of said pocket, said one side of said insert disposed at right angles to said bottom face of said insert; and
 biasing means urging the body portion of said holding member in an opposite direction when said screw means is backed away so as to release said cutting insert.

References Cited by the Examiner

UNITED STATES PATENTS

| | | | |
|---|---|---|---|
| 3,146,656 | 9/1964 | Richards | 29—96 |
| 3,154,974 | 11/1964 | Greenleaf | 29—96 |
| 3,226,797 | 1/1966 | Hertel | 29—96 |

FOREIGN PATENTS 1,126,701  3/1962  Germany.

WILLIAM W. DYER, JR., *Primary Examiner.*

HARRISON L. HINSON, *Examiner.*